United States Patent [19]

La Liberte

[11] 4,108,827

[45] Aug. 22, 1978

[54] COLORLESS ALLYL DIGLYCOL CARBONATE

[75] Inventor: Norman U. La Liberte, Woodstock, Conn.

[73] Assignee: American Optical Corporation, Southbridge, Mass.

[21] Appl. No.: 749,901

[22] Filed: Dec. 13, 1976

[51] Int. Cl.$^2$ ............................................. C08K 5/56
[52] U.S. Cl. .................................. 260/42.21; 526/115
[58] Field of Search ................ 260/863; 526/115, 271, 526/317, 42.21

[56] References Cited

U.S. PATENT DOCUMENTS

| | | | |
|---|---|---|---|
| 3,216,958 | 11/1965 | Sheld | 260/23.5 |
| 3,872,042 | 3/1975 | Bond | 260/45.8 NT X |
| 3,920,590 | 11/1975 | Jacobs et al. | 260/863 X |
| 4,001,348 | 1/1977 | Selbeck et al. | 260/863 X |

Primary Examiner—Sandra M. Person
Attorney, Agent, or Firm—Jeremiah J. Duggan; Howard R. Berkenstock, Jr.

[57] ABSTRACT

Composition of matter and process for imparting a colorless appearance to cast allyl diglycol carbonate articles such as lenses and lens blanks and for simultaneously imparting to the article an ability to fluoresce when subjected to ultraviolet light. The composition comprises about 40 parts maleic anhydride, maleic acid, copolymers of propylene glycol with maleic acid or maleic anhydride, or mixtures thereof, and between about 0.5 and 1.5 parts of a mixture of 10 parts cobalt acetyl acetonate and between about 0.4 parts to 1.2 parts copper acetyl acetonate. Between about 0.05 and 0.15 parts of the composition is mixed with 1600 parts allyl diglycol carbonate monomer-catalyst prepolymer mixture and cast to form the desired article.

11 Claims, No Drawings

COLORLESS ALLYL DIGLYCOL CARBONATE

BACKGROUND OF THE INVENTION

This invention relates to a composition of matter which may be added to conventional allyl diglycol carbonate resins to impart a colorless appearance to optically clear allyl diglycol carbonate articles such as lenses and lens blanks produced therefrom.

Allyl diglycol carbonate resins have been extensively used to form optically clear, ophthalmic quality lens blanks and lenses. While such resins provide a highly desirable material for manufacturing such articles, they are characterized by a faint but obviously noticeable yellow color which makes them readily distinguishable from glass. Attempts to formulate prepolymer mixtures which appear "colorless" when polymerized have not been successful. The term "colorless" as used hereinafter, refers to a glass-like appearance, i.e., a very slight bluish tinge such as that possessed by glass lenses when viewed from the side.

Furthermore, with the increase in the number of allyl diglycol carbonate ophthalmic quality lenses manufactured, it has become increasingly more difficult for any one manufacturer to identify his products after sale. In this regard, it would be highly desirable for an individual manufacturer to be able to quickly and easily identify his products from those of competitors when a lens is returned for repair or replacement.

The composition of matter of the instant invention, when incorporated into conventional allyl diglycol carbonate articles, not only imparts the desired colorless appearance, but also imparts a faint but distinct ultraviolet activated fluorescence to the product which enables simple and rapid identification thereof.

SUMMARY OF THE INVENTION

At the heart of the instant invention is the discovery that a combination of two well-known plastic colorants, i.e., cobalt acetyl acetonate and copper acetyl acetonate, when mixed in certain proportions with maleic acid, maleic anhydride, or copolymers of certain glycols with maleic anhydride or maleic acid, can, when added in effective amounts to conventional allyl diglycol resins, impart to articles made therefrom both a colorless appearance and the ability to fluoresce when exposed to ultraviolet radiation. The copper acetyl acetonate alone imparts a greenish blue tint, the cobalt acetyl acetonate alone imparts a pink to rust tint. However, a proper combination of these two colorants together with such resins as monopropylene glycol monomaleate comprise a "colorless concentrate" which enables the manufacture of articles which are free from the characteristic yellow color of such articles and which, from a visual standpoint, are virtually indistinguishable from glass articles.

In the preferred embodiments of the invention, a concentrate is provided which comprises about 40 parts of a substance selected from the group consisting of maleic anhydride, maleic acid, copolymers of propylene glycol with maleic anhydride or maleic acid, and mixtures thereof, and between about 0.5 and 1.5 parts of a mixture consisting of about 10 parts cobalt acetyl acetonate and between 0.4 and 1.2 parts copper acetyl acetonate. A still more preferred concentrate composition comprises 40 parts of a copolymer consisting of the product of reaction of substantially equimolar quantities of propylene glycol with maleic anhydride, about 0.9 parts cobalt acetyl acetonate, and about 0.07 parts copper acetyl acetonate.

The concentrate may be added, as such, to allyl diglycol carbonate resins, in the proportion of 16 parts resin to between 0.05 and 0.15 parts concentrate. After incorporation and thorough mixing of the concentrate with the resin, optically clear articles may be formed by various well-known techniques, e.g., casting, to provide colorless articles virtually indistinguishable on visual observation from glass.

In addition, when articles formed as disclosed above are exposed to ultraviolet radiation, they exhibit a faint but distinctive fluoresence which provides a simple and effective method of identifying the articles after they have been commercially distributed. To further increase the fluorescence, a fluorescent dye may also be included in the prepolymer composition in a concentration of less than about 10 parts per million, preferably about 0.25 parts per million, without affecting the color.

Alternatively, the process of the invention may be practiced by adding each of the components disclosed above, in proper proportions, directly to a ready-to-use prepolymer without first formulating a concentrate.

Accordingly, it is an object of the invention to provide a method of producing allyl diglycol carbonate articles which exhibit a colorless appearance.

Another object of the invention is to provide a composition of matter which may be easily formulated from inexpensive materials for incorporation into conventional allyl diglycol carbonate resins to remove the yellow color normally present in products cast therefrom.

Another object of the invention is to provide a simple method of uniquely identifying allyl diglycol carbonate articles after they have been commercially distributed.

Still another object of the invention is to provide a process for forming a colorless, optically clear, allyl diglycol carbonate article, e.g., an ophthalmic quality lens or lens blank.

Other objects and features of the invention will be apparent from the following description of some preferred embodiments.

DESCRIPTION OF THE PREFERRED EMBODIMENTS

At the outset, the invention is described in its broadest overall aspect with a more detailed description following.

It is believed that prior art attempts to remove the yellow color naturally present in resins such as allyl digylcol carbonate have generally been successful only where another color has been substituted for the characteristic yellow color. In contrast, the present invention provides a composition which can neutralize the yellow color to yield a colorless cast allyl diglycol carbonate article. The composition of matter of the invention may be formulated as a concentrate and thereafter added directly to the prepolymers in amounts disclosed below to produce the colorless articles. Alternatively, the individual components of the concentrate may be added separately and directly to the prepolymer to achieve the same effect. However, the prior procedure is preferred since the small but critical amounts of the components of the composition of the invention are easier to incorporate in the prepolymer mixtures if they are first mixed as a batch of concentrate.

Three components are essential to the composition of the invention. The first is cobalt acetyl acetonate, a known colorant which alone in sufficient concentration imparts a pink to rust tint to allyl diglycol carbonate polymers and copolymers of allyl diglycol carbonate with maleates. The second component is copper acetyl acetonate which alone in sufficient concentration imparts a greenish blue tint to these resins. The third component comprises maleic acid, maleic anhydride, and/or copolymers of propylene glycol, ethylene glycol, or glycerin with maleic anhydride or maleic acid. The presence of one or more of these latter substances with the combination of the cobalt and copper acetonates in proper proportion alters the coloring characteristic of each of the colorants, or in some way interacts with the colorants, to produce a substance which effectively neutralizes the natural yellow color of cast allyl diglycol carbonate articles.

The relative amounts of these three substances in the concentrate of the invention are as follows: 40 parts resinous material selected from among those indicated above; and between about 0.5 and 1.5 parts of a mixture of 10 parts cobalt acetyl acetonate and between 0.4 and 1.2 parts copper acetyl acetonate. A preferred composition comprises 40 parts of the product of reaction of substantially equimolar quantities of propylene glycol with maleic anhydride, 0.9 parts cobalt acetyl acetonate, and about 0.07 parts copper acetyl acetonate.

Between about 0.05 and 0.15 parts of this composition is then added to about 16 parts allyl diglycol carbonate containing a catalyst such as isopropyl percarbonate. A trace amount of an ultraviolet absorber (optional) and .25 parts per million of a fluorescent dye such as that sold under the trademark Uvitex-OB may also be added if desired.

The invention will be further understood from the following examples which in no event should be construed as limiting.

EXAMPLE 1

A lens forming composition comprising 800 grams of the allyl diglycol carbonate resin sold under the tradename CR-39, 0.0175 grams of copper acetyl acetonate, 4.0 grams of monopropylene glycol monomaleate (hereinafter MPGMM), 0.20 grams of UVA #9 (2 hydroxy benzophenone, American Cyanimide), and 25 grams of isopropyl percarbonate were blended, filtered, and cast by conventional techniques to form lens blanks. After curing, the products exhibited a light bluish-green tint. No yellow color could be observed, but it had been replaced by the greenish blue color characteristic of the metallo-organic dye.

EXAMPLE 2

800 grams of CR-39, 0.08 grams of cobalt acetyl acetonate, 4.0 grams of MPGMM, 0.2 grams UVA #9, and 25 grams of isopropyl percarbonate were blended and cast by conventional techniques. The lens blanks produced had a pink to rust tinge which effectively masked the natural yellow color of the untinted material.

EXAMPLE 3

A prepolymer mix consisting of 800 grams of CR-39, 4 grams MPGMM, 0.12 grams cobalt acetyl acetonate, 0.20 grams UVA #9, and 25 grams isopropyl percarbonate was prepared as disclosed above. A second prepolymer mix identical to the first except that .015 grams copper acetyl acetonate was substituted for the cobalt acetonate was also prepared. These two prepolymer mixes were then blended in a 50/50 ratio by weight. The blend was stirred and cast into blanks, minus lenses, and plus lenses. The cast products had a good, clear colorless appearance when compared to the products cast without the colorants. When subjected to ultraviolet light, these products exhibited a faint but detectable fluoresence.

EXAMPLE 4

Using the composition of Example 3, the following variables were tested to determine their effect on the lenses and the following results were obtained.

| PARAMETER | VARIATION | Result |
| --- | --- | --- |
| % catalyst included | 2.77 – 3.25 | no effect on color |
| Curing cycle | overnight cycle to rapid 5 hour cycle | no effect on color |
| % methyl methacrylate included | 0% to 40% | no effect on color |
| Picking time | picked at 10% to 50% Dye Rate Cure | no effect on color |
| Air aging | Run in parallel with conventional CR-39 lenses for up to 250 hours Time (Hr.) | no effect on color |
| Humidity Aging at 190° F (100% rel. humidity) | 24<br>48<br>72<br>100 | Exhibited excellent color stability comparable or greater than conventional polycarbonate articles |
| Roof Exposure | 30 days on roof | no effect on color |
| "Fadeometer" testing* | 100 hours in Fadeometer | no effect on color |

*Commercially available accelerated aging apparatus

EXAMPLE 5

The procedure of Example 3 was repeated except that an approximately equimolar mixture of propylene glycol and maleic anhydride, blended by conventional techniques, was substituted for the MPGMM. The optically clear products made with the procedure and formulation of this example exhibited a color which was indistinguishable from that of the products of Example 3.

EXAMPLE 6

The procedure of Example 3 was repeated, except that the MPGMM was omitted. Cast products made from this formulation exhibited a color that was initially very similar to the normal yellow tinged products of the prior art. Furthermore, when subjected to humidity aging such as that disclosed in Example 4, these lenses were observed to have much less stable color than the formulations which included the MPGMM. Of the various monomers useful in the invention, the most stable color is produced when a mixture of proplyene glycol and maleic anhydride is used.

EXAMPLE 7

A prepolymer mix was prepared using 386.4 grams of CR-39, 13.6 grams of isopropyl percarbonate, 1.2 grams of maleic anhydride, 1.2 grams of propylene glycol, 0.05 grams of cobalt acetyl acetonate, 0.0055 grams of copper acetyl acetonate, and 0.10 grams of UVA #9. This composition produced cast products having a colorless appearance which was stable when subjected to humidity testing.

EXAMPLE 8

The procedure of Example 9 was repeated except that an equal amount of maleic acid was substituted for the maleic anhydride. The cast products made from this composition were indistinguishable from the products of Example 7.

EXAMPLE 9

In order to promote ease of handling and standardization of the concentrations of colorants in the allyl diglycol carbonate cast articles, concentrates have been prepared which may be added to the carbonate monomer-polymerization catalyst mixture to impart the desired effect. One successful concentrate was formulated as follows:

174 grams of propylene glycol, at 140° F, were mixed with 226 grams of maleic anhydride at the same temperature. After blending these components and allowing them to react, 0.74 grams of copper acetyl acetonate and 9.0 grams of cobalt acetyl acetonate were added thereto. The mixture was warmed and stirred until all metallic salts had been dissolved and was thereafter filtered through a medium porosity filter.

9.3 grams of this concentrate was then added to a prepolymer composition comprising 1,655 grams of allyl diglycol carbonate mixed with isopropyl percarbonate. This prepolymer mix was stirred and filtered through a 7 to 10 micron Millipore filter before casting. The mixture produces colorless lenses and lens blanks of normal hardness.

EXAMPLE 10

The procedure of Example 9 was repeated except that Ciba-Geigy Uvitex-OB, a fluorescent dye which is activated by ultraviolet light to give off a blue color, was added to the concentrate so that its final concentration in the cast product was about 0.25 parts per million. The addition of this substance had no effect on the properties of the cast products other than to reinforce the weak fluorescence which naturally occurs in the articles containing the composition of the invention. The addition of the dye makes the identification procedure more determinative. Other fluorescent dyes could be used for this purpose, and in fact, the dye is an optional ingredient which could be omitted.

The invention may be embodied in other specific forms without departing from the spirit or essential characteristics thereof. The present embodiments are therefore to be considered in all respects as illustrative, and not restrictive, the scope of the invention being indicated by the appended claims rather than by the foregoing description, and all changes which come within the meaning and range of equivalency of the claims are therefore intended to be embraced therein.

I claim:

1. An optically clear, colorless, ophthalmic quality lens comprising about 16 parts allyl diglycol carbonate and between about 0.05 and 0.15 parts of a composition comprising 40 parts of a member selected from the group consisting of maleic anhydride, maleic acid, the products of reaction of propylene glycol, ethylene glycol, and glycerin with maleic anhydride or maleic acid, and mixtures thereof, and between about 0.5 and 1.5 parts of a mixture consisting essentially of 10 parts cobalt acetyl acetonate and between 0.4 and 1.2 parts copper acetyl acetonate.

2. The lens as set forth in claim 1 further comprising a fluorescent dye present in a concentration less than about 10 parts per million.

3. The lens as set forth in claim 1 wherein said member is monopropylene glycol monomaleate.

4. The lens as set forth in claim 1 comprising about 0.09 parts of said composition.

5. An optically clear, colorless, ophthalmic quality lens consisting essentially of 1600 parts allyl digylcol carbonate, between about 5 and 15 parts of the product of reaction of propylene glycol and maleic anhydride, between 0.1 and 0.3 parts cobalt acetyl acetonate, and between about 0.005 and 0.03 parts copper acetyl acetonate.

6. The lens as set forth in claim 5 comprising 9 parts monopropylene glycol monomaleate, about 0.20 parts cobalt acetyl acetonate, and about 0.015 parts copper acetyl acetonate.

7. The lens as set forth in claim 5 further comprising a trace amount of a compatible ultraviolet absorber.

8. A process for forming a colorless, optically clear allyl diglycol carbonate article, said process being characterized by the steps of:
  1. providing a polymerizable allyl diglycol carbonate prepolymer containing a polymerization catalyst;
  2. providing a colorless concentrate comprising about 40 parts of a member selected from the group consisting of maleic anhydride, maleic acid, the products of reaction of propylene glycol, ethylene glycol and glycerin with maleic acid, the products of reaction of propylene glycol, ethylene glycol, and glycerin with maleic anhydride, and mixtures thereof, and between about 0.5 and 1.5 parts of a mixture consisting essentially of 10 parts cobalt acetyl acetonate and between 0.4 and 1.2 parts copper acetyl acetonate;
  3. mixing 16 parts of said prepolymer with between 0.05 and 0.15 parts of said concentrate; and
  4. shaping and curing the mixture produced in step 3 to form said article.

9. The process as set forth in claim 8 wherein said article is an ophthalmic quality lens blank.

10. The process as set forth in claim 8 wherein said concentrate comprises 40 parts of the product of reaction of equimolar quantities of propylene glycol with maleic anhydride, about 0.9 parts cobalt acetyl acetonate, and about 0.07 parts copper acetyl acetonate.

11. The process as set forth in claim 8 wherein about 0.10 parts concentrate is mixed with 16 parts resin.

* * * * *

UNITED STATES PATENT AND TRADEMARK OFFICE
CERTIFICATE OF CORRECTION

PATENT NO. : 4,108,827
DATED : August 22, 1978
INVENTOR(S) : Norman U. Laliberte It is certified that error appears in the above-identified patent and that said Letters Patent are hereby corrected as shown below:

In column 1, line 45, before "resins", insert --carbonate--.

Signed and Sealed this

Eighteenth Day of September 1979

[SEAL]

Attest:

LUTRELLE F. PARKER
Attesting Officer     Acting Commissioner of Patents and Trademarks